(12) United States Patent
Vukovic et al.

(10) Patent No.: US 7,609,639 B2
(45) Date of Patent: Oct. 27, 2009

(54) NEGATIVE ACKNOWLEDGMENT (NAK) SUPPRESSION

(75) Inventors: Ivan N. Vukovic, Arlington Heights, IL (US); John M. Harris, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 1636 days.

(21) Appl. No.: 10/071,475

(22) Filed: Feb. 7, 2002

(65) Prior Publication Data

US 2003/0159099 A1    Aug. 21, 2003

(51) Int. Cl.
*G01R 31/08* (2006.01)
*H04J 3/24* (2006.01)

(52) U.S. Cl. .................. 370/236; 370/473

(58) Field of Classification Search ........... 370/229, 370/230, 235, 236, 236.1, 236.2, 428–429
See application file for complete search history.

(56) References Cited

U.S. PATENT DOCUMENTS

| | | | | |
|---|---|---|---|---|
| 5,414,717 A | * | 5/1995 | Matsumoto et al. | 714/748 |
| 5,519,693 A | * | 5/1996 | Galuszka et al. | 370/276 |
| 5,892,894 A | * | 4/1999 | Shiroshita et al. | 714/4 |
| 6,011,796 A | | 1/2000 | Rezaiifar et al. | |
| 6,112,323 A | | 8/2000 | Meizlik et al. | |
| 6,381,215 B1 | | 4/2002 | Hamilton et al. | |
| 6,567,388 B1 | * | 5/2003 | Tomcik et al. | 370/335 |

FOREIGN PATENT DOCUMENTS

| | | |
|---|---|---|
| EP | 0 969 623 A2 | 1/2000 |
| JP | 11055345 | 2/1999 |
| WO | 9635312 A1 | 11/1996 |
| WO | WO 02 03597 A1 | 1/2002 |

OTHER PUBLICATIONS

Srinivasan, S. "Efficient Data Consistency in HLA/DIS++". *IEEE* 1996 Winter Simulation Conference Proceedings, Coronado, CA Dec. 8-11, 1996; pp. 946-951.

* cited by examiner

*Primary Examiner*—Seema S. Rao
*Assistant Examiner*—Christine Duong

(57) ABSTRACT

Logic circuitry (409) constantly monitors a transmitter (410) to determine if the transmitter (410) is idle. Logic circuitry (409) suppresses all NAKs until data and other channel information is not being transmitted by the transmitter (410) and RF resources are not scarce. Additionally, logic circuitry (409) suppresses all NAKs until a predetermined number of NAKs has been buffered by the logic circuitry (409). More particularly, logic circuitry (409) determines when a number of NAKs will sufficiently fill an over-the-air frame. Once the predetermined number of NAKs has been collected, the logic circuitry (409) will generate the appropriate NAKs.

3 Claims, 3 Drawing Sheets

- PRIOR ART -

- PRIOR ART -

- PRIOR ART -

400

NEGATIVE ACKNOWLEDGMENT (NAK) SUPPRESSION

FIELD OF THE INVENTION

The present invention relates generally to communication systems and in particular, to negative acknowledgment (NAK) suppression within such communication systems.

BACKGROUND OF THE INVENTION

In current Code Division Multiple Access (CDMA) communication systems, a Radio Link Protocol (RLP) is utilized for the link layer to transport data traffic between a mobile unit and infrastructure equipment. RLP is a Negative-Acknowledgment (NAK) based protocol in that the receiver does not acknowledge correctly-received RLP frames. In-order delivery is accomplished with the use of a sequence number (SEQ) on each frame. RLP maintains a counter for the sequence number of the next new data frame to send [SEQ(S)] and a counter for the sequence number of the next new data frame it expects to receive [SEQ(R)]. RLP requests the retransmission of RLP frames when a frame is received with a sequence number greater than the next expected sequence number (SEQ(R)). Retransmission is accomplished by sending a NAK to the transmitter identifying the sequence number of the frame not received. Prior to receiving the NAK'd frame, subsequently transmitted RLP frames continue to be received by the receiver.

FIG. 1 illustrates the current RLP NAK procedure. As shown, frames 101 are transmitted by a transmitter over the air and are received by a receiver as frames 102. During over-the-air transmission, oftentimes data is lost and needs to be retransmitted to the receiver. This is illustrated in FIG. 1 as frame F3 being lost. Upon receiving frame F4, the receiver immediately realizes that frame F3 is missing and requests retransmission of F3 by sending a NAK to the transmitter. The current RLP protocol standard specifies that the NAK control frame takes precedence over any RLP frames carrying data or other channel information. Upon reception of the NAK, the transmitter retransmits F3.

It should be noted that a single NAK can request retransmission of several RLP frames (as shown in FIG. 2). In FIG. 2 RLP frames F2 and F3 are lost. Upon reception of the RLP frame F4 the receiver detect the sequence gap and sends a single NAK frame requesting retransmission of 2 RLP frames, F2 and F3.

A problem arises when the receiver fails to receive multiple frames in a short period of time. In that situation a steady stream of NAK frames will be transmitted by the receiver, congesting the communication link from the receiver to the transmitter. An example of this problem is shown in FIG. 3. In a typical application (e.g., web browsing), data flow is asymmetrical. For large Frame Erasure Rate (FER) or for cases where many sequence numbered frames arrive per frame interval, there is a high probability of having at least one RLP frame being erased in each transmission interval. In FIG. 3, RLP frames F4, F7, F15, and F18 were erased in 4 consecutive transmission intervals. The gaps in sequence numbers will generate 4 consecutive NAK frames requesting retransmission of the missing RLP frames. No other user/control data (such as TCP/IP ACKs) can be transmitted from the receiver to the transmitter while this situation persists. Because the client needs to respond to each packet downloaded by sending a TCP/IP ACK, the TCP/IP ACKs are delayed while waiting for an interval where no RLP NAKs are being sent.

Prior-art methods have attempted to deal with the flood of NAK frames that result during poor channel conditions. For example, U.S. Pat. No. 6,112,323 entitled "METHOD AND COMPUTER PROGRAM PRODUCT FOR EFFICIENTLY AND RELIABLY SENDING SMALL DATA MESSAGES FROM A SENDING SYSTEM TO A LARGE NUMBER OF RECEIVING SYSTEMS" describes a system of NAK suppression where a delay time is selected according to a defined probability function. The above technique results in a predictable number of NAK frames being sent after a given delay time. By adjusting the probability density as a function of various system parameters (such as the network packet loss rate), the number of NAK frames sent at a given time can be adjusted to suit network conditions.

Although the above-procedure does reduce the impact of multiple NAKs being sent, the above-procedure still results in NAKs being sent at inopportune time periods. Therefore, a need exists for a method and apparatus for NAK suppression within a communication system that more accurately determines the best time period to transmit NAK frames in order to reduce system resource load.

DETAILED DESCRIPTION OF THE DRAWINGS

To address the above-mentioned need, a method and apparatus for NAK suppression is provided herein. In accordance with the preferred embodiment of the present invention, logic circuitry constantly monitors a data transmit queue to determine if the there is any user data to be sent. Logic circuitry suppresses creation and transmission of NAK frames until certain conditions have been met. These conditions can be expressed as Logical (Boolean) variable whose value is determined by testing the following: NAK sequence list size, NAK sequence number waiting time, data and other channel information queue size, and the waiting time of data in the data queue. As a part of this test, logic circuitry suppresses all NAK frames until a predetermined number of sequence numbers to be NAKed has been buffered by the NAK generator. More particularly, logic circuitry determines when a number of sequence numbers to be NAKed reaches the maximum that can be carried by a single NAK RLP frame. Once the predetermined number of sequence numbers has been collected, the logic circuitry will instruct the NAK generator to generate a NAK frame.

The above-procedure reduces congestion of data and other channel information by allowing it to be transmitted even in cases where many NAK frames are being generated.

The present invention encompasses a method of negative acknowledgment (NAK) suppression. The method comprises the steps of determining that a NAK needs to be transmitted and determining if data or other channel information currently needs to be transmitted over a channel. The NAK is transmitted if data and other channel information does not need to be transmitted over the channel, otherwise the NAK is buffered.

The present invention additionally encompasses a method comprising the steps of determining that a NAK needs to be transmitted over a channel, determining a number of NAKs currently buffered, and transmitting the NAKs currently buffered along with the NAK if the predetermined number of NAKs have been buffered, otherwise buffering the NAK.

The present invention additionally encompasses an apparatus. The apparatus comprises a buffer storing NAKs and logic circuitry coupled to the buffer, the logic circuitry having a transmission status of a transmitter as an input and outputting instructions for a NAK generator to generate NAKs based on the transmission status of the transmitter.

Figure 4:
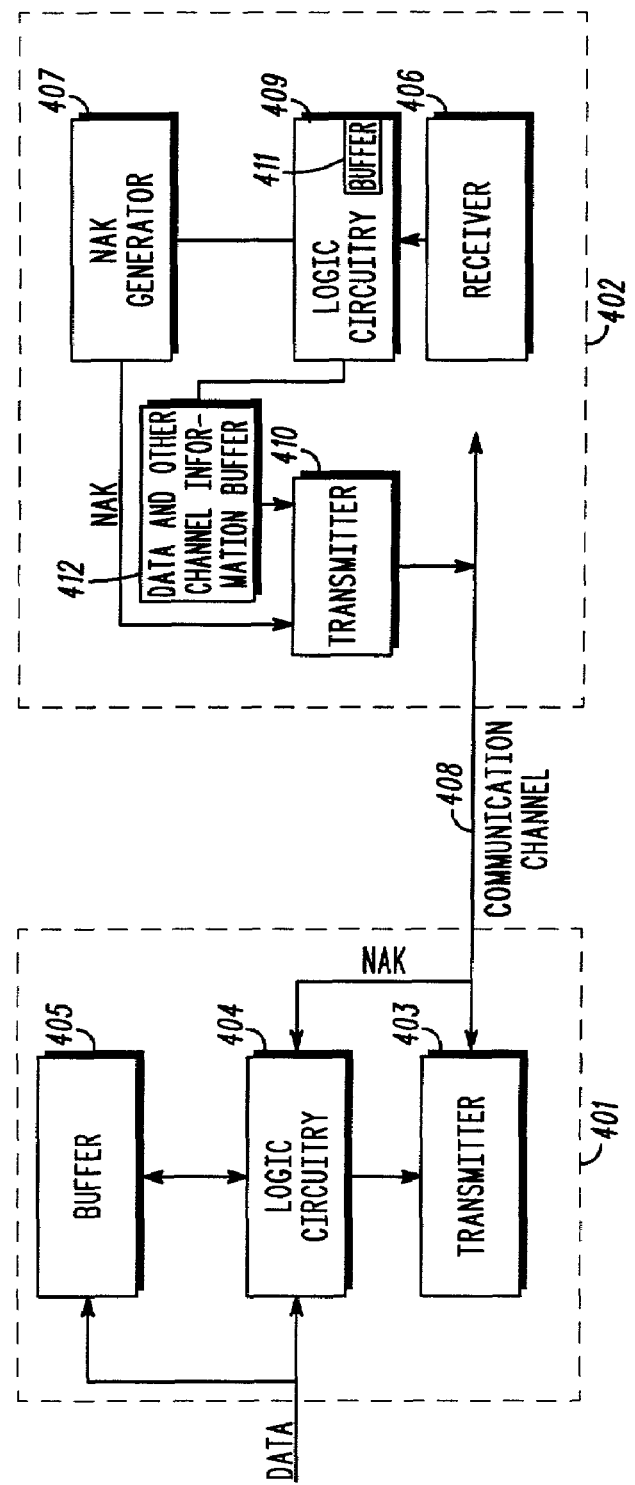
FIG. 4 is a block diagram of a communication system in accordance with the preferred embodiment of the present invention.

Turning now to the drawings, wherein like numerals designate like components, FIG. 4 is a block diagram of communication system 400 in accordance with the preferred embodiment of the present invention. As shown, communication system 400 comprises transmitting circuitry 401 and receiving circuitry (or remote unit) 402. Transmitting circuitry is preferably a CDMA Radio Access Network such as a Motorola SC Centralized Base Site Controller and Motorola SC 4800 Base Transceiver System, and receiving circuitry is preferably a mobile, or cellular handset such as a Motorola StarTAC®.

During operation data enters logic unit 404 and buffer 405. The data is passed from logic unit 404 to transmitter 403 where it is transmitted over communication channel 408 to receiving circuitry 402. The CDMA over-the-air protocol utilizes RLP. As discussed above, RLP is a Negative-Acknowledgment based protocol in that the receiver does not acknowledge correctly-received RLP frames. Receiving circuitry 402 only requests the retransmission of missing RLP frames by sending a NAK to the transmitter. In particular, when a frame is received out of sequence, receiver 406 will instruct NAK generator 407 to NAK the improperly received (or un-received) frame. The NAK will be transmitted over communication channel 408 and received by transmitting circuitry 401 (via a receiver, not shown). The NAK is eventually received by logic unit 404, and logic unit 404 retrieves the lost frame from buffer 405 and instructs transmitter 403 to retransmit the frame to receiving circuitry 402.

As discussed above, a problem arises when receiver 406 fails to receive multiple frames in a short period of time or when the frame losses are distributed in a way to produce at least one RLP sequence gap at the receiver in each transmission period with high probability (for example 0.8). In that situation, prior-art systems produce a flood of NAK frames, taking up valuable system resources. In order to address this situation, in the preferred embodiment of the present invention NAK suppression is utilized. More particularly, logic circuitry 409 buffers all sequence numbers that need to be NAKed in buffer 411, and instructs NAK generator 407 to transmit the NAK frame or plurality of NAK frames when system conditions are met. More particularly, logic circuitry 409 suppresses NAK frame generation if data and other channel information in the buffer 412 has been waiting for more than a prespecified time interval (e.g., 100 milliseconds), or the buffer 412 size has reached a prespecified level (e.g., 64 bytes), or the remaining RF capacity in the system is less than some threshold. If at least one of the three conditions are met, then the NAK generation will be suppressed and the data or other channel information will be transmitted from the receiver to the transmitter in the current transmission period.

If neither of the two conditions are met, logic circuitry 409 will instruct NAK generator 407 to create NAK frame if the sequence number buffer 411 is non-empty.

In the preferred embodiment of the present invention, logic circuitry 409 will not suppresses generation of a NAK (as described above) if a NAK delay timer has expired or a pre-specified number of sequence numbers to be NAKed has been reached. If one of the two condition is satisfied the logic circuitry 409 instructs NAK generator 407 to create a NAK frame including all sequence numbers buffered in 411. Specifically, NAKs are always generated when the number of NAKs to be sent completely fills an over-the-air frame, or are older than a predetermined age (e.g., 3 seconds).

The above-procedure reduces congestion of data and other channel information by allowing it to be transmitted even in cases where many NAKs are being generated. Additionally, RF capacity is increased by reducing the number of NAK frames sent when RF Resources are scarce.

Figure 5:
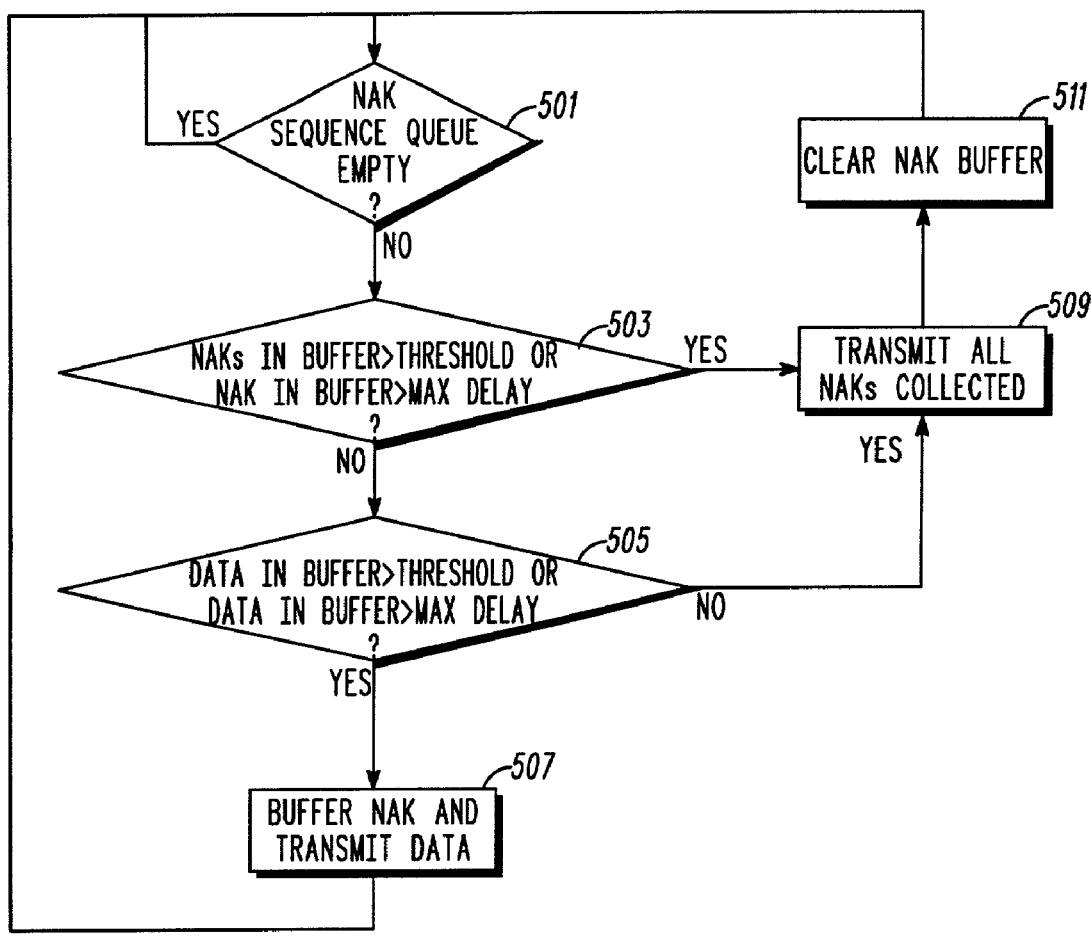
FIG. 5 is a flow chart showing operation of the communication system of FIG. 2 in accordance with the preferred embodiment of the present invention.

FIG. 5 is a flow chart showing operation of the communication system of FIG. 4 in accordance with the preferred embodiment of the present invention. The logic flow begins at step 501 where logic circuitry 409 determines if a NAK frame needs to be transmitted by transmitting circuitry 401. Condition for this is the presence of at least one sequence number to be NAKed in the buffer 411. If at step 501 it is determined that a NAK needs to be transmitted, the logic flow continues to step 503, otherwise the logic flow simply returns to step 501.

At step 503, logic circuitry 409 determines whether the amount of sequence numbers in buffer 411 is above a pre-specified threshold or any sequence number has been queued for longer than a prespecified period of time (e.g., 3 seconds). If neither of the two conditions is true, the logic flow continues to step 505, otherwise logic circuitry 409 instructs NAK generator 407 to generate and transmit a NAK frame filling it with sequence numbers residing in buffer 411 (step 509) and to clear buffer 411 (step 511).

At step 505 logic circuitry 409 determines if an amount of data in buffer 412 is above a prespecified threshold or the data in buffer in 412 has been queued for longer than a prespecified period of time. If either condition is true then the logic flow continues to step 507 where the NAKs continue to be buffered and data and other channel information transmitted. If both conditions tested for at step 505 are false, the logic flow continues to step 509 where logic circuitry 409 instructs NAK generator 407 to generate and transmit a NAK frame filling it with sequence numbers residing in buffer 411.

Figure 1:
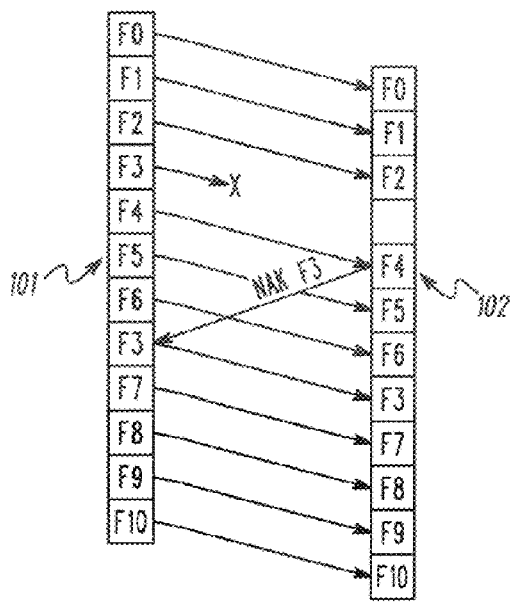
FIG. 1 illustrates prior-art RLP NAK procedure with one sequence number retransmission request transmitted in a NAK.
Figure 2:
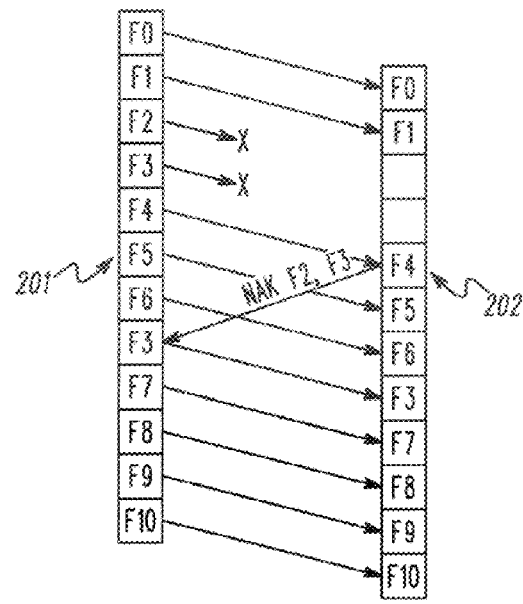
FIG. 2 illustrates prior-art RLP NAK procedure with more than one sequence number retransmission request in a NAK.
Figure 3:
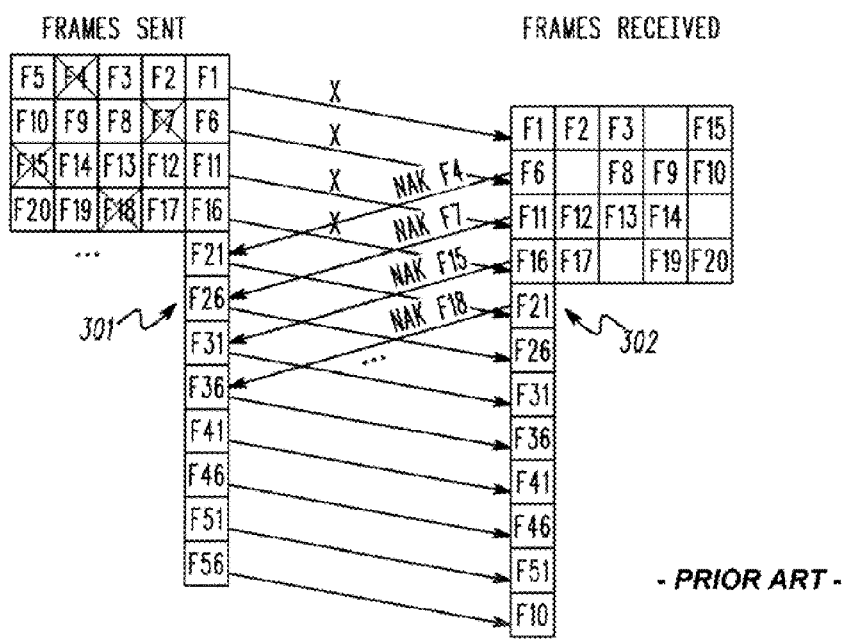
FIG. 3 illustrates the problem with prior-art RLP NAK procedure where a plurality of RLP NAK frames are transmitted in consecutive transmission periods.

As discussed above, the above-procedure reduces the burden that multiple NAK frame transmissions place on system resources. In particular, from FIG. 3 we can see that by placing a delay limit on NAK frame to be 2 transmission intervals and setting the maximum number of sequence numbers per NAK frame to 2 the number of NAK frames sent is reduced by 50% and the corresponding RF resource is now available for data and other channel information to be transmitted. For example, in FIG. 3 the four consecutive NAK frames could delay a TCP/IP ACK segment sent by the receiver by at least 4 transmission periods, which in turn increases the roundtrip time for TCP, causing TCP timeouts and throughput degradation.

While the invention has been particularly shown and described with reference to a particular embodiment, it will be understood by those skilled in the art that various changes in form and details may be made therein without departing from the spirit and scope of the invention. For example, although the above description employs several techniques for reducing the effect that multiple NAK transmissions have on system resources, one of ordinary skill in the art will recognize that each technique may be utilized individually. It is intended that such changes come within the scope of the following claims.

The invention claimed is:

1. A method of negative acknowledgment (NAK) suppression, the method comprising the steps of:
   in a receiver,
   determining that a NAK needs to be transmitted over a channel for a first time;
   determining if data or other channel information currently needs to be transmitted over the channel;
   determining if a predetermined number of NAKs have been buffered; and
   transmitting the NAK only when data and other channel information does not need to be transmitted over the channel and when the predetermined number of NAKs equal to an amount of NAKs required to fill an over-the-air frame have been buffered, otherwise buffering the NAK.

2. A method comprising the steps of:
   in a receiver,
   determining that a NAK needs to be transmitted over a channel for a first time;
   determining a number of NAKs currently buffered;
   determining if data or other channel information currently needs to be transmitted over the channel; and
   transmitting the NAKs currently buffered along with the NAK only when the predetermined number of NAKs equal to an amount of NAKs required to fill an over-the-air frame have been buffered and only when data and other channel information does not need to be transmitted over the channel, otherwise buffering the NAK.

3. An apparatus comprising:
   a buffer storing NAKs; and
   logic circuitry coupled to the buffer, the logic circuitry having a transmission status of a transmitter as an input and outputting instructions for a NAK generator to generate NAKs only when a transmission status of the transmitter comprises information that no data or other channel information is currently awaiting transmission and comprises information that a predetermined number of NAKs equal to an amount of NAKs required to fill an over-the-air frame have been buffered.

* * * * *